United States Patent [19]

Blumhardt et al.

[11] Patent Number: 5,727,058
[45] Date of Patent: Mar. 10, 1998

[54] APPARATUS AND METHOD FOR ROUTING COMMUNICATIONS TO A VARIETY OF CPE DEVICES

[75] Inventors: Mark Sheldon Blumhardt, Niwot; Gregory Wilfred Bruening, Boulder, both of Colo.

[73] Assignee: U S West Advanced Technologies, Inc., Boulder, Colo.

[21] Appl. No.: 557,927

[22] Filed: Nov. 14, 1995

Related U.S. Application Data

[63] Continuation of Ser. No. 40,546, Mar. 31, 1993, abandoned.

[51] Int. Cl.$^6$ .................................................. H04M 11/00
[52] U.S. Cl. .................... 379/242; 379/243; 379/201; 379/90.01; 395/200.57
[58] Field of Search .................. 395/200.01, 800; 379/199, 100, 92, 207, 211, 106, 233, 142, 201, 242, 243; 364/DIG. 1; 370/110.1; 358/400

[56] References Cited

U.S. PATENT DOCUMENTS

| | | | |
|---|---|---|---|
| 5,012,511 | 4/1991 | Hanle et al. | 379/211 |
| 5,121,423 | 6/1992 | Morihiro et al. | 379/142 |
| 5,189,695 | 2/1993 | Maei | 379/199 |
| 5,216,517 | 6/1993 | Kinoshita et al. | 358/400 |
| 5,220,599 | 6/1993 | Sasano et al. | 379/142 |
| 5,247,571 | 9/1993 | Kay et al. | 379/207 |
| 5,278,972 | 1/1994 | Baker et al. | 395/500 |
| 5,291,549 | 3/1994 | Izumi | 379/233 |
| 5,313,463 | 5/1994 | Gore et al. | 370/110.1 |
| 5,329,581 | 7/1994 | Friedes et al. | 379/92 |
| 5,394,461 | 2/1995 | Garland | 379/106 |
| 5,418,844 | 5/1995 | Morrisey et al. | 379/207 |
| 5,422,941 | 6/1995 | Hasenauer et al. | 379/207 |
| 5,457,693 | 10/1995 | Sasaki | 370/110.1 |

OTHER PUBLICATIONS

Burson et al., "Optimizing Communications Solutions", IEEE Communications Magazine, pp. 15–19, Jan. 1993.

*Primary Examiner*—Alyssa H. Bowler
*Assistant Examiner*—Walter D. Davis
*Attorney, Agent, or Firm*—Brooks & Kushman

[57] ABSTRACT

Provided is an apparatus and method for routing communications in an Advanced Intelligent Network (AIN) having at least one central office switch. The disclosed system routes communications from a calling party having at least one Customer Premises Equipment (CPE) device to a secondary party having a single calling number for a plurality of CPE devices, each having a corresponding communication address. In operation, communications are routed to a central office switch which is provided in electrical communication with at least one adjunct processor. Thereafter, the desired type of secondary CPE device sought to be accessed is identified in cooperation with storage means which is provided in electrical communication with the adjunct processor. As disclosed, the storage means is provided for storing a directory having a plurality of secondary party calling numbers and corresponding communication addresses. Following identification of the type of secondary CPE device sought to be accessed, the corresponding secondary party communication address is identified and a control signal is forwarded to said central office switch such that the communication will be properly routed to the desired secondary party at the corresponding communication address.

8 Claims, 6 Drawing Sheets fig-4

Fig-5 fig-6

APPARATUS AND METHOD FOR ROUTING COMMUNICATIONS TO A VARIETY OF CPE DEVICES

This is a continuation of application Ser. No. 08/040,546, filed on Mar. 31, 1993, now abandoned.

TECHNICAL FIELD

This invention relates generally to Advanced Intelligent Network (AIN) services and, more particularly, to a system for automatically routing communications to selected secondary parties having a single calling number for a plurality of Customer Premises Equipment (CPE) devices.

BACKGROUND ART

As communication technology has advanced, the use of facsimile and voice messaging services, as well as EDI and data transmissions have increased accordingly. Indeed, it is now common for even a small business to have several CPE devices, each of which must be accessed by a unique calling number or communication address. As those skilled in the art will recognize, a common problem for such users occurs when a data transmission such as a facsimile message, for example, is sought to be forwarded and only the telephone number (calling number) of the intended recipient is known. Under such circumstances, separate calls are typically required to identify the recipient's CPE dialing number or extension. Such activity is wasteful of time and resources which could more properly be spent on more productive matters. Moreover, if a separate call is required, the originating party must further incur the expense of an additional telephone call. If a long distance carrier is utilized, a corresponding toll must also be incurred.

One attempt to address the difficulties encountered when a receiving party has a plurality of CPE devices is disclosed in U.S. Pat. No. 5,018,191 (the '191 patent) issued to Catron et al and entitled "Special Service Call Routing." The '191 patent is assigned of record to AT&T Bell Laboratories, Murray Hill, N.J. As disclosed in the '191 patent, AT&T provides for the use of databases disposed in both the ingress and egress interexchange switches (IXC and EXC) which are adapted to forward facsimile connection indicators sent with Common Channel signalling (CCS) messages for respective calls. Facsimile calls are recognized by an originating message from an Integrated Services Digital Network (ISDN) line, a dial prefix or an alternative common carrier code from an ordinary line. Thereafter, a fax class mark is set in the IXC office and transported across the CCS network so that the terminating IXC office may then route appropriately. As seen, the call routing architecture disclosed in the '191 patent is highly complex and inherently requires all of the network subscribers to utilize specially programmed switching equipment and CPE devices. Moreover, local calls which would not normally use an IXC office must now do so. Because of the time, expense and political considerations involved, the call routing system disclosed in the '191 patent has met with much adversity.

Attempts to simplify the signal routing system of the '191 patent have included the use of Message Transferring Agents (MTA) provided in electrical communication with switches and Service Control Points (SCP). These designs, however, have also met with adversity because they inherently require the use of store and forward operations. By design, such systems must also transmit voice and data to and from Message Transferring Agents. Thus, inter-LATA (Local Address Transport Area) uses are limited, if not prohibited.

DISCLOSURE OF THE INVENTION

It is an object of the present invention to overcome the limitations of the prior art by providing a communication routing system for directing communications from a calling party having at least one customer premises equipment (CPE) device to a secondary party having a single calling number for a plurality of CPE devices.

A more specific object of the present invention is the provision of a system for automatically routing communications in an Advanced Intelligent Network (AIN) in cooperation with an adjunct processor from a calling party having at least one CPE device to a secondary party having a single calling number for a plurality of CPE devices, each having a corresponding communication address.

Yet another object of the present invention is the provision of a method of automatically routing communications in a Public Switched Telephone Network (PSTN) having AIN architecture from a calling party having at least one CPE device to a secondary party having a single calling number for a plurality of CPE devices, each having a corresponding communication address.

In carrying out the above objects, there is provided a service control point/adjunct processor in electrical communication with at least one Service Switching Point (SSP)/central office switch in a Public Switched Telephone Network having AIN architecture. The SCP/adjunct is adapted to receive and forward control signals only so as to coordinate the routing of communications throughout the network. There is further provided first routing means in electrical communication with the Service Switching Point and at least one calling party CPE device for routing respective communications. Still further, there is provided storage means in electrical communication with the adjunct processor for storing a directory having a plurality of secondary party calling number and corresponding communication addresses for respective secondary party CPE devices. Finally, there is provided second routing means in electrical communication with the central office switch for routing respective communication signals to and from secondary party CPE devices.

In keeping with the invention, the method steps disclosed herein include the initial routing of communications from an originating CPE device to the central office switch. An adjunct processor is similarly provided in electrical communication with the central office such that the desired type of secondary CPE device sought to be accessed may be identified. Storage means is further provided for storing a directory having a plurality of secondary party calling numbers and corresponding communication addresses for respective secondary party CPE devices. The method steps further include the generation of a first control signal for receipt by the storage means. As disclosed herein, the control signal corresponds to the respective secondary party calling number and the identified type of CPE device sought to be accessed. Thereafter, the corresponding communication address of the secondary party sought to be contacted must be determined. Accordingly, a second control signal is generated for receipt by the adjunct processor corresponding to the determined communication address. The communication is thereafter routed from the central office to the secondary party CPE device at the determined address.

The objects, features and advantages of the present invention are readily apparent from the following detailed description of the best mode for carrying out the invention when taken in connection with the accompanying drawings.

BEST MODES FOR CARRYING OUT THE INVENTION

Figure 1:
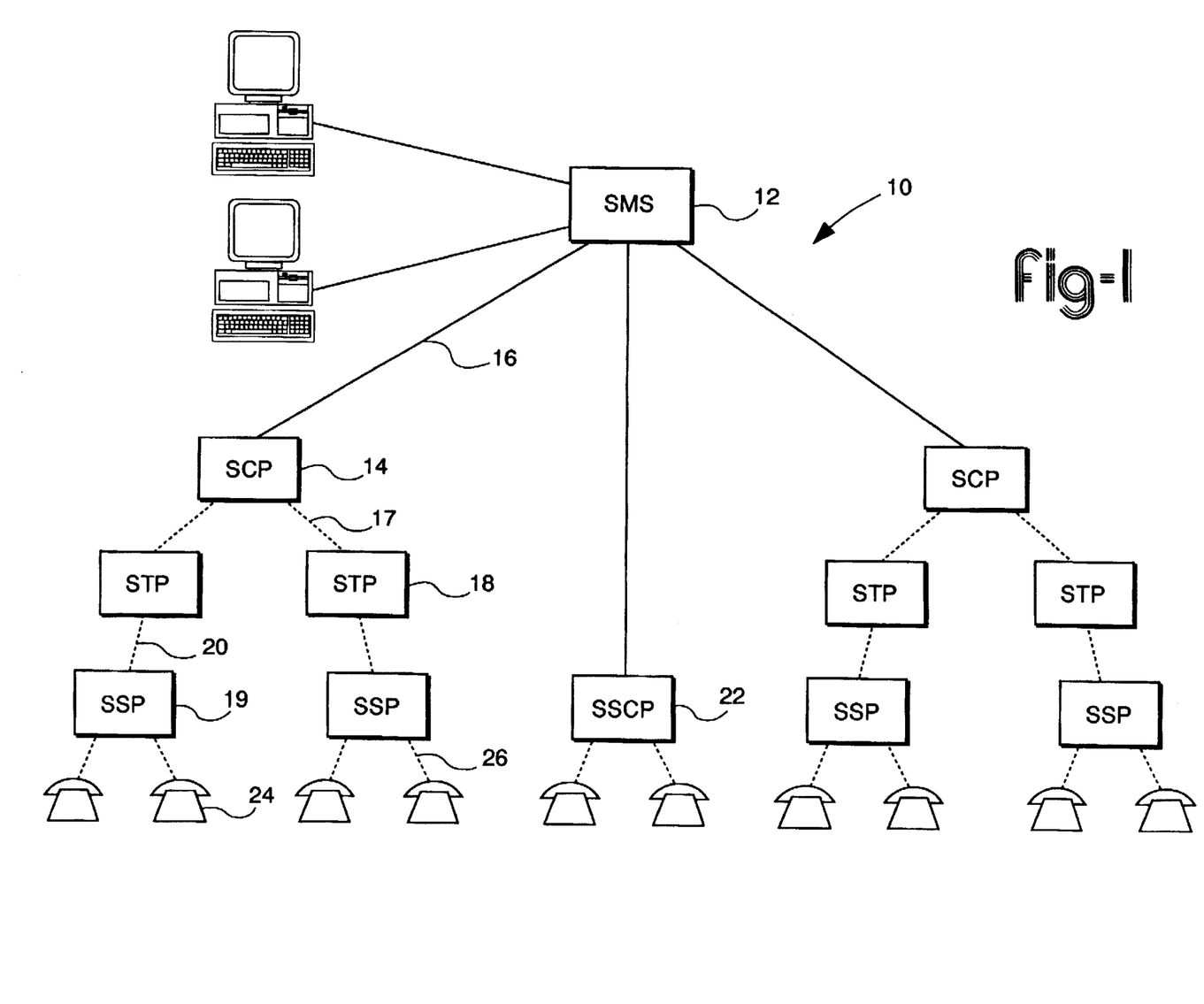
FIG. 1 is a block diagram of a representative Advanced Intelligent Network (AIN)

With reference to FIG. 1 of the drawings, a representative diagram of Advanced Intelligent Network (AIN) architecture is disclosed for use in a public Switched Telephone Network (PSTN). The AIN architecture referred to is designated generally by reference numeral 10. As those skilled in the art will recognize, network architecture 10 is implemented with common channel Signaling System No. 7 (SS7) protocol. Designed to be used primarily in high-speed digital networks, Common Channeling Signaling System No. 7 is capable of controlling low-speed analog facilities as well. SS7 generally operates at 64 kbPS and can support variable message links up to 2,176 bits (272 octets) of information per message.

As those skilled in the art will recognize, the SS7 network is comprised of various packet switching elements and transmission lengths, some of which are shown in network architecture 10. As seen, there is provided Service Management System (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of Service Control Points (SCP)/adjuncts 14 via management links 16. As those skilled in the art will recognize, AIN Service Control Points 14 are nodes which contain the service logic and associated data support to execute the required customer services.

Still further, there is provided Signal Transfer Points (STP) 18 in electrical communication with SCP/adjunct via signaling links 17. Service Transfer Points 18 are packet switches used to route signaling messages within the network. Service Switching Points (SSP) 19 are also provided. Again, as those skilled in the art will recognize, Service Switching Points 19 are generally nodes (usually the subscribers local switch/central office switch) that recognize the "triggers" used when a subscriber invokes an intelligent network service and then communicates with the SCP to operate the service. As shown, Service Switching Points 19 are provided in electrical communication with Signal Transfer Points 18 via signalling links 20. In limited traffic situations, Service Switching and Control Points (SSCP) 22 are also provided for combining the functions of the SCP and SSP. Finally, subscribers 24 are provided, each having at least one Customer Premises Equipment (CPE) device such as a facsimile machine, voice messaging peripheral, modem or the like. As shown, CPE devices 24 are provided in electrical communication with Service Switching Points 19 via signalling links 26.

The AIN architecture referenced above is known to those skilled in the art to permit services to be extended through the network. In operation, new services are typically installed on two SCP processing platforms for directly servicing a selected market. In operation, this service management system extends management and control to the remote Service Control Points/adjuncts via a signalling network.

Figure 2:
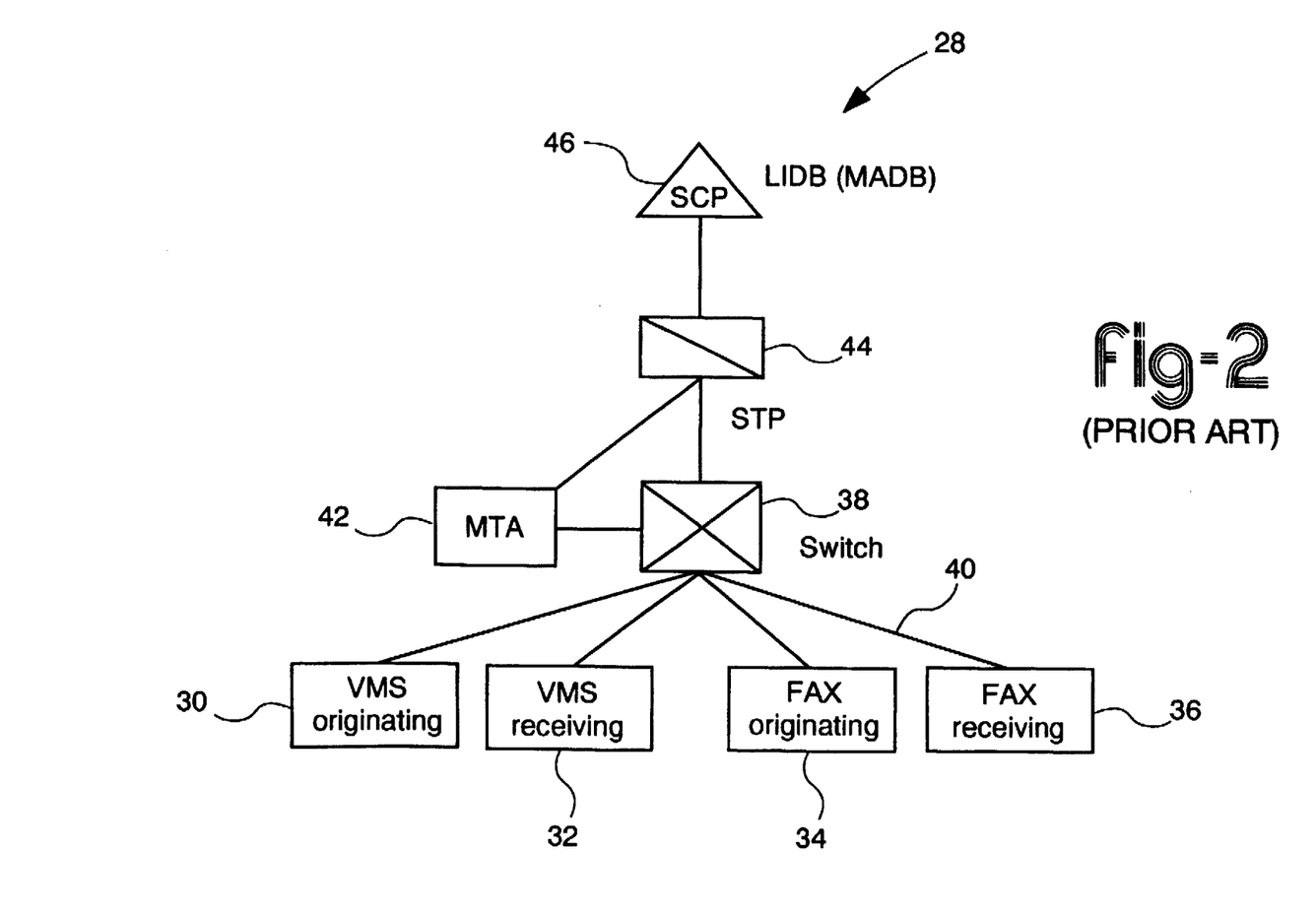
FIG. 2 is a block diagram of a prior art Message Transport and Routing Service utilizing store and forward functions of a Message Transferring Agent (MTA)

Turning now to FIG. 2, there is shown a simplified block diagram of a prior art communications routing system adapted for use in a Public Switched Telephone Network provisioned for AIN architecture. The prior art communications routing system is designated generally by reference numeral 28 and is shown including a plurality of originating and receiving CPE devices. Specifically, there is provided an originating voice messaging system 30 and a corresponding receiving voice messaging system 32. Similarly, there is provided an originating facsimile device 34 and a receiving facsimile device 36. Each of these CPE device are provided in electrical communication with switch 38 via signalling links 40 along with the required protocol, i.e., Audio Messaging Interchange Specification (AMIS) and Group 3, respectively. Prior art system 28 further includes a Message Transferring Agent 42 provided in electrical communication with switch 38 and STP 44 having Signalling System No. 7 (SS7) linkages. SCP 46 is also provided in electrical communication with STP 44.

As referenced above, MTA 42 has proven unsuitable for most network operations because of its inherent store and forward design. As seen, in operation, a facsimile message from CPE device 34, for example, would be required to be routed through switch 38 to MTA 42 in its entirety. After the appropriate instructions are received from SCP 46, the stored facsimile will be rerouted from MTA 42 through switch 38 to the receiving facsimile CPE device 36. As readily seen, this design is exceedingly slow. For example, when voice messaging equipment is used in intra-LATA (local address transport area) operations, as shown, a three minute message could take as long as eight minutes to route. In inter-LATA operations, the same message might take as long as 12 minutes to route. Expenses are further multiplied by the requirement that at least one MTA processor and SS7 link be provided per LATA.

Figure 3:
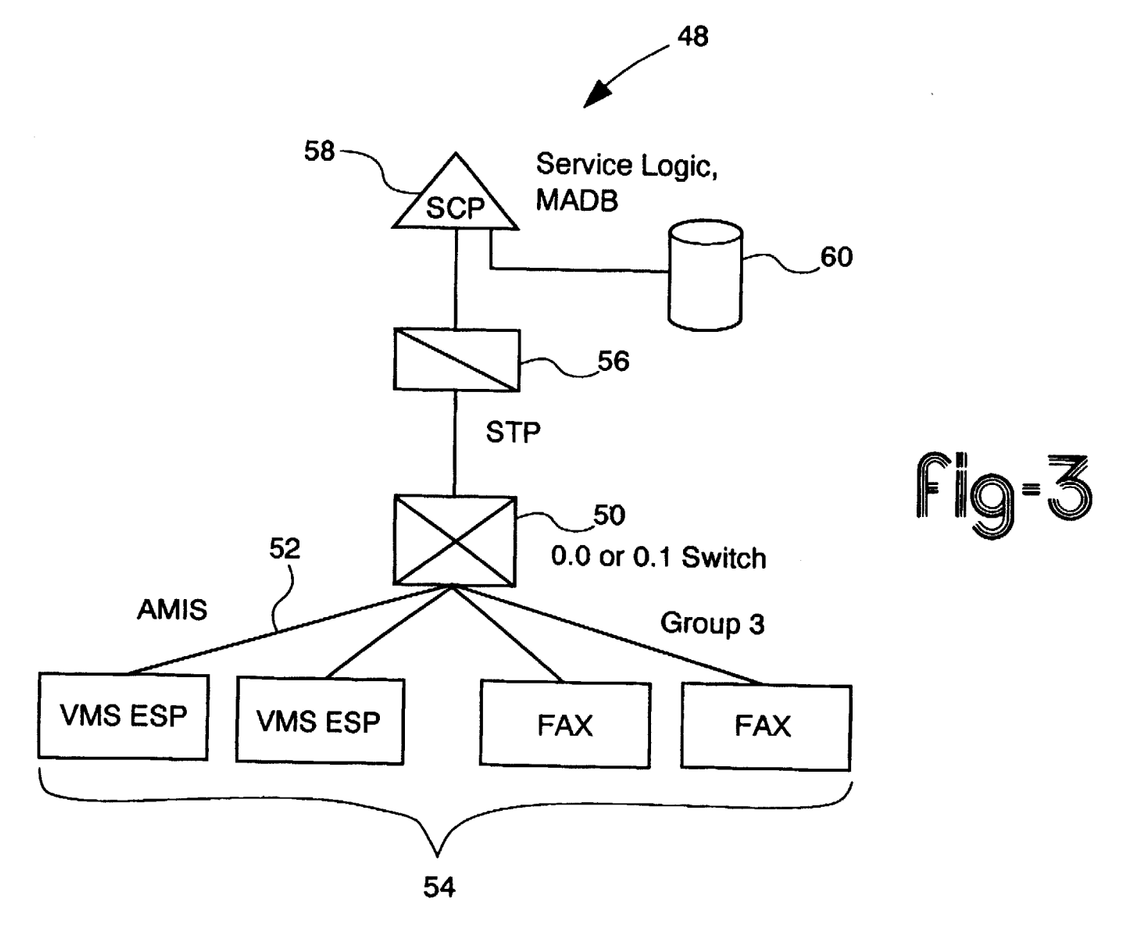
FIG. 3 is a block diagram of an intra-LATA facsimile and voice messaging system designed in accordance with the present invention.

Turning now to FIG. 3, a simplified schematic block diagram of the communications routing system of the present invention is provided and designated generally by reference numeral 48. System 48 includes at least one Service Switching Point (SSP) more commonly referred to as an AIN Central Office Switch (COS) 50. In the preferred embodiment switch 50 uses existing AIN 0.0 or 0.1 platforms and is provided in electrical communication with a plurality of originating and receiving CPE devices via signalling links 52. CPE devices shown generally by reference numeral 54 may include, for example, voice messaging systems, facsimile machines, telephones, EDI devices, modems, and the like. As those skilled in the art will recognize, AMIS, Group 3 and EDI protocol are utilized for respective originating and receiving CPE devices such that users and recipients having different CPE devices may properly communicate. System 48 further includes Signal Transfer Point 56 having Signalling System No. 7 (SS7) linkages provided in electrical communication with SSP 50 and SCP/adjunct 58. In keeping with the invention, there is also provided a Message Addressing Database (MADB) 60 in electrical communication with SCP 58.

Figure 4:
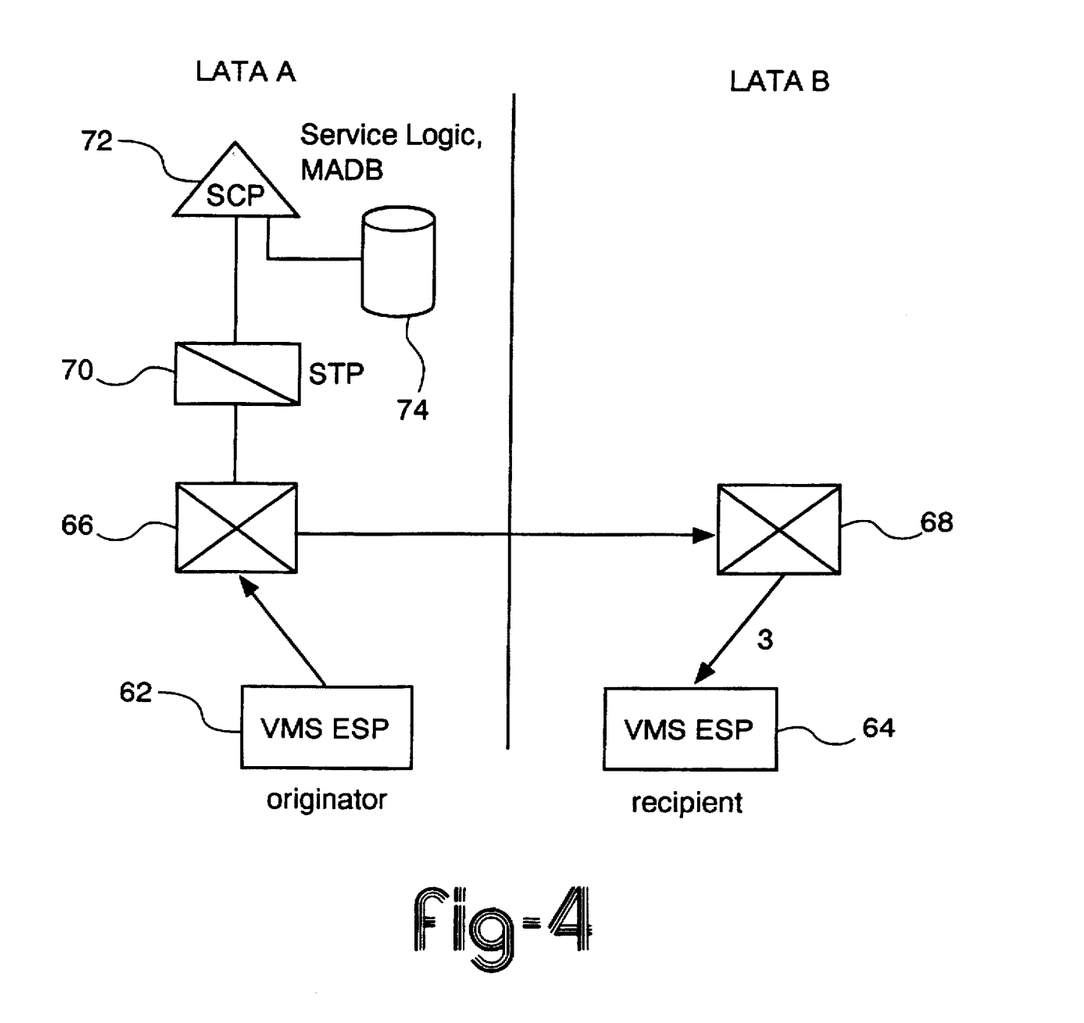
FIG. 4 is a block diagram of an inter-LATA voice messaging system designed in accordance with the present invention.
Figure 5:
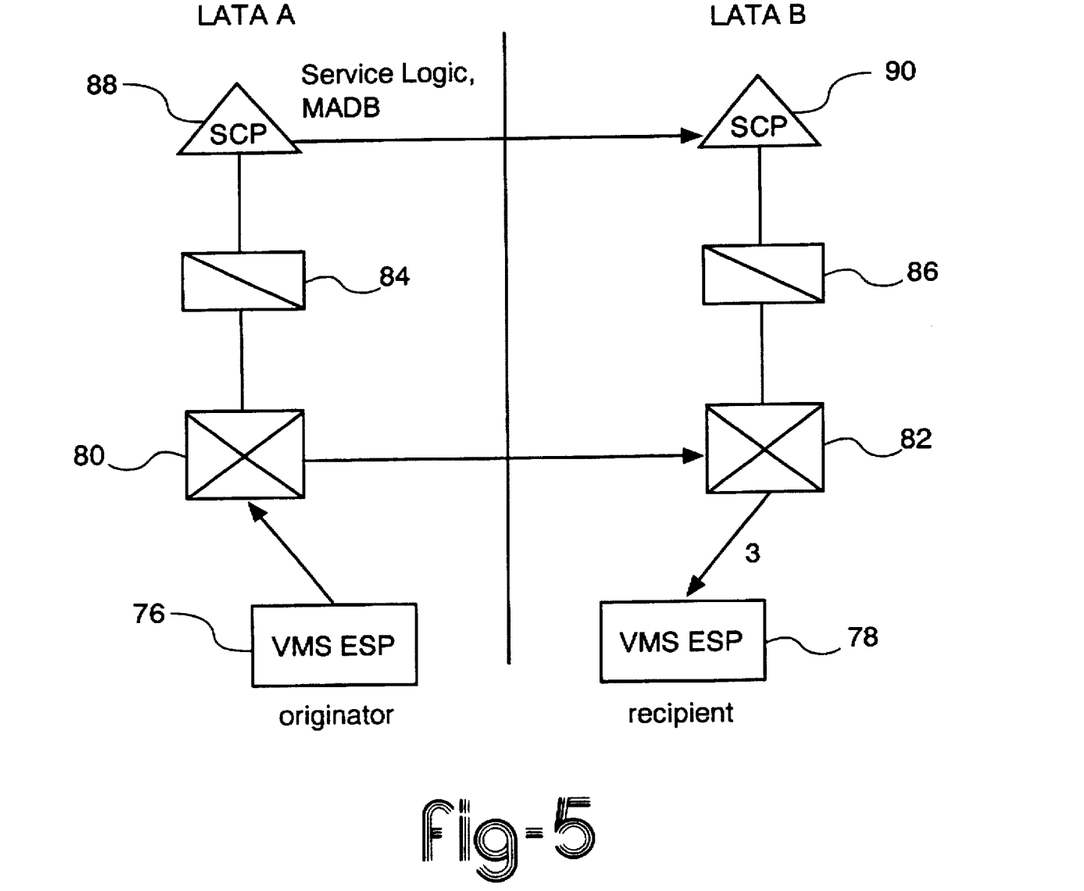
FIG. 5 is a block diagram of an alternative embodiment of an inter-LATA voice messaging system designed in accordance with the present invention.
Figure 6:
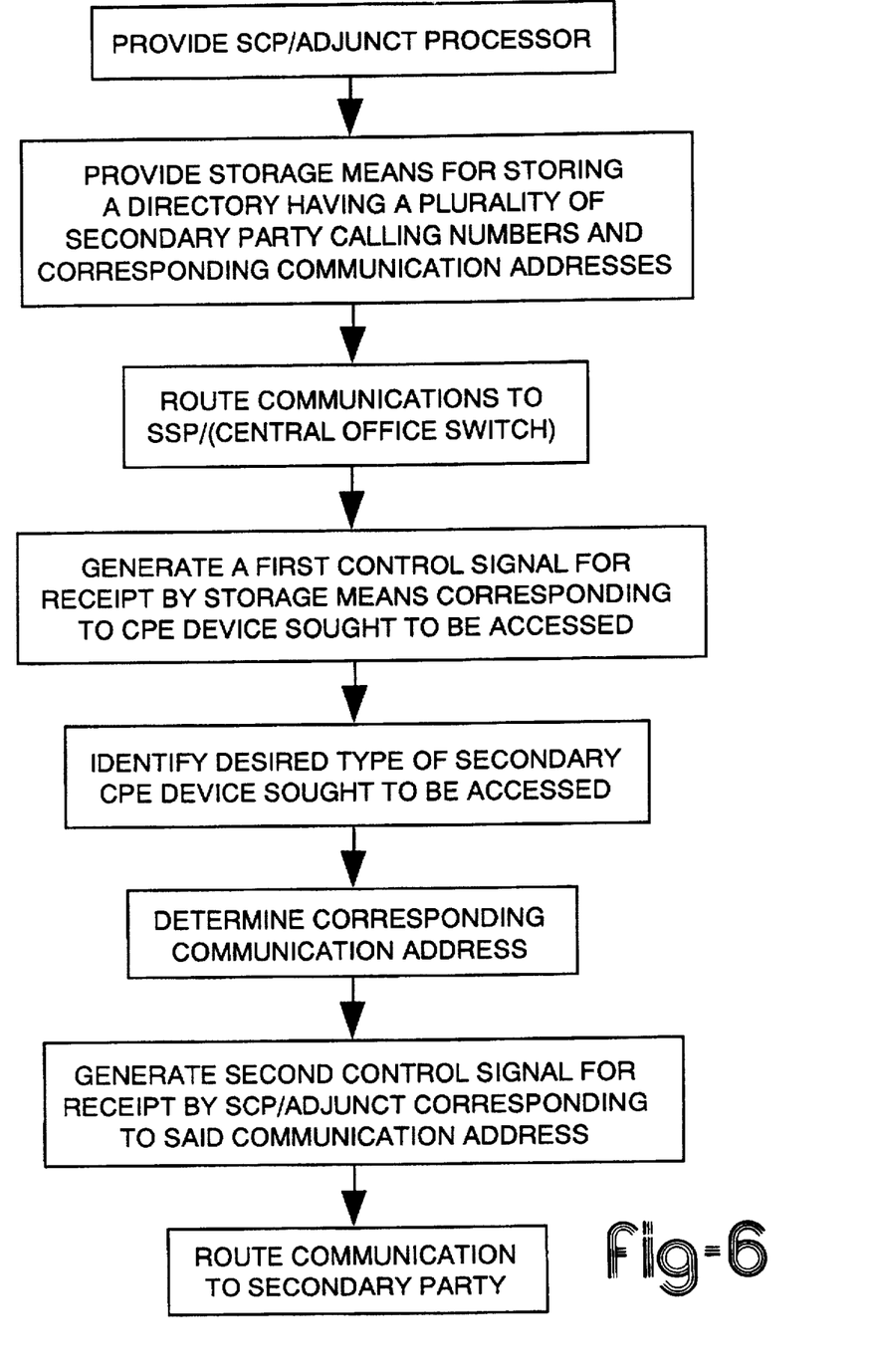
FIG. 6 is a block diagram of the method steps of the present invention.

With reference now to FIGS. 4-5, there is shown block diagrams of the communications routing system of the present invention shown for use with voice messaging systems in inter-LATA operation. As seen, there is provided both an originating and a receiving voice messaging system 62 and 64, each of which are provided in electrical communication with an SSP 66 and 68, respectively. In one preferred embodiment, STP 70, SCP/adjunct 72 and MADB 74 are all located in LATA A. In a second preferred embodiment shown in FIG. 5, LATAs A and B each have respective voice messaging systems 76 and 78, switches 80 and 82 and Signal Transfer Points 84 and 86. In the embodiment of FIG. 5, however, SCP/adjunct 88 of LATA A and its corresponding MADB are further provided in electrical communication with SCP/adjunct 90 of LATA B and its corresponding database.

OPERATION

Referring to FIGS. 3–6, the operation of the signal routing system of the present invention will now be described in further detail.

As seen, in its simplest form, the system of the present invention is adapted to automatically route communications from a calling party having at least one CPE device to a secondary party having a single calling number for a plurality of CPE devices. Thus, for example, each of the CPE devices 54 shown in FIG. 3 may be accessed by a single calling number—despite the fact that each has a unique communication address.

In the preferred embodiment each of the originating CPE devices is provided in electrical communication with the Central Office Switch (COS) via a dedicated AIN line. Thus, the originating switch may identify at inception, the type of communication sought to be routed. In operation, the originating CPE device dials the recipient at the known calling number. Upon receipt, the SSP 50 will send a query to the SCP/adjunct 58 to obtain the recipient's corresponding access number from the MADB 60. Once the access number is located, the SCP/adjunct 58 responds to the SSP 50, directing the SSP to route the call to the designated CPE device.

Significantly, only control/processing commands are forwarded to and from the SCP 58. Thus, contrary to prior art systems which utilize a Message Transferring Agent, the present invention does not make use of store and forward commands. Because voice and data transmission are only transmitted between switches, inter-LATA operation is thus permissible and may be utilized through user selected long distance carriers.

As referenced above, in the preferred embodiment, each of the CPE devices is provided in electrical communication with a corresponding Service Switching Point via a dedicated line. Service logic in the originating switch is programmed such that when a communication arrives, it is automatically directed to a corresponding SCP/adjunct if it is not a telephone call. Telephone calls are directly routed to the called party upon receipt.

Applicants also contemplate situations where a calling party may have a single line directed to several CPE devices, i.e., a modem, fax machine, telephone, etc. In such situations, the single-number dialing approach of the present invention may still be utilized in cooperation with feature access codes. Thus, a code such as *77 for a fax and *88 for voice messaging may be input prior to the dialing number. In operation, the SCP/adjunct will be programmed to recognize respective feature access codes so as to reference the corresponding CPE at the calling party's end. In this single-line setup, all calls, including telephone calls, must of course be analyzed by the SCP/adjunct to obtain the proper routing instructions.

With reference to FIG. 5 of the drawings, the generalized method steps of the present invention applicable for any originating and receiving CPE device are provided in further detail. As seen, the method steps include the provision of an SCP/adjunct processor. Provision is also made for storage means for storing a directory having a plurality of secondary party calling numbers and corresponding communication addresses. Communications are routed to the Service Switching Points (SSP)/central office switches. Thereafter, a first control signal is generated for receipt by the storage means. This control signal corresponds to the CPE device sought to be accessed. The type of secondary CPE device sought to be accessed is thereafter identified and the corresponding communication address is determined. A second control signal is then generated for receipt by the SCP/adjunct corresponding to the communication address. Finally, the communication is routed to the secondary party at the determined address.

While the best modes for carrying out the invention has been described in detail, those familiar with the art to which this invention relates will recognize various alternative designs and embodiments for practicing the invention as defined by the following claims.

What is claimed is:

1. An automated call handling system for use in an Advanced Intelligent Network (AIN), the system comprising:

a central office switch provided in electrical communication with (a) a calling party having at least one Customer Premise Equipment (CPE) device, and (b) a plurality of secondary parties, each of the plurality of secondary parties having a unique calling number for a plurality of assigned CPE devices at multiple locations, each of the CPE devices having a unique communication address;

first routing means in electrical communication with the at least one CPE device of the calling party for routing the call to the central office switch;

service identification means at the central office switch for determining the type of secondary party CPE device sought to be addressed;

storage means at a location different from the at least one calling party CPE device and the plurality of secondary party CPE devices and provided in electrical communication with the central office switch for storing a predetermined directory of the corresponding communication addresses for each assigned CPE device of each of the secondary parties;

an adjunct processor in electrical communication with the storage means and the at least one central office switch, the adjunct processor functioning to receiving and transmit control signals only and to coordinate the routing of the call; and second routing means in electrical communication with the central office switch for routing the call to one of the plurality of assigned CPE devices.

2. A system as in claim 1, wherein said first routing means comprises a dedicated line corresponding to said at least one calling party CPE device.

3. A system as in claim 1, wherein said storage means comprises a Message Addressing Database (MADB).

4. A system as in claim 1, wherein said adjunct processor further comprises identification means for determining a desired type of secondary CPE device sought to be accessed.

5. A system as in claim 1, wherein said identification means recognizes and distinguishes selected feature access codes.

6. A system as in claim 1, wherein said communications are selected from a group consisting of telephone calls, facsimile transmissions, EDI transmissions, voice-mail and e-mail.

7. A system as in claim 1, wherein said adjunct processor comprises a Service Control Point (SCP) of said AIN.

8. An automated call handling method for use in an Advanced Intelligent Network (AIN), the method comprising:

providing a central office switch in electrical communication with (a) a calling party having at least one Customer Premise Equipment (CPE) device, and (b) a plurality of secondary parties, each of the plurality of secondary parties having a unique calling number for a plurality of assigned CPE devices at multiple locations, each of the CPE devices having a unique communication address;

routing a call to the central office switch;

providing storage means at a location different from the at least one calling party CPE device and the plurality of secondary party CPE devices and in electrical communication with the central office switch for storing a predetermined directory of the corresponding communication addresses for each assigned CPE device of each of the secondary parties;

providing an adjunct processor in electrical communication with the storage means and the at least one central office switch;

identifying at the central office switch a desired type of secondary parties CPE device sought to be accessed;

generating a first control signal for receipt by the adjunct processor, the control signal corresponding to a secondary party calling number and a desired type of secondary parties CPE device sought to be accessed;

determining the corresponding communication address of the secondary party CPE device and generating a second control signal for receipt by the central office switch corresponding thereto; and routing the communication from the central office switch to the secondary party CPE device at the corresponding communication address.

* * * * *